United States Patent
Baretsky et al.

(10) Patent No.: US 7,379,085 B2
(45) Date of Patent: May 27, 2008

(54) SYSTEM AND METHOD FOR REDUCING NON-LINEARITY ERRORS BETWEEN TWO IMAGING STATIONS

(75) Inventors: Thomas M. Baretsky, Fairport, NY (US); Rosario A. Bracco, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 306 days.

(21) Appl. No.: 11/138,088

(22) Filed: May 26, 2005

(65) Prior Publication Data

US 2006/0268098 A1    Nov. 30, 2006

(51) Int. Cl.
   *B41J 2/435* (2006.01)
(52) U.S. Cl. ....................................... 347/249
(58) Field of Classification Search ................ 347/116, 347/240, 251, 229, 234–235, 248–250; 382/300; 702/89; 177/25.14; 356/448
   See application file for complete search history.

(56) References Cited

U.S. PATENT DOCUMENTS

| | | | | |
|---|---|---|---|---|
| 4,455,090 A | * | 6/1984 | Roberts | 356/448 |
| 4,766,560 A | | 8/1988 | Curry et al. | |
| 5,131,482 A | * | 7/1992 | Davis et al. | 177/25.14 |
| 6,178,031 B1 | | 1/2001 | Rauch et al. | |
| 6,522,983 B1 | * | 2/2003 | Dobos et al. | 702/89 |
| 6,529,643 B1 | * | 3/2003 | Loce et al. | 382/300 |
| 2004/0085438 A1 | | 5/2004 | Zamorrodi et al. | |
| 2004/0090522 A1 | | 5/2004 | Rauch et al. | |

* cited by examiner

*Primary Examiner*—Hai C Pham
(74) *Attorney, Agent, or Firm*—Maginot, Moore & Beck

(57) ABSTRACT

A system and method for spatially matching the output of two imaging stations in an electro-photographic device by using a second order polynomial curve and a third order polynomial curve to approximate the non-linearity errors between the two imaging stations and using the second order polynomial curve and the third order polynomial curve to modify the frequency of a pixel clock.

12 Claims, 10 Drawing Sheets

| | | | | | |
|---|---|---|---|---|---|
| 21 | 0000001 | 65 | 0011111 | 20 | 1000110 |
| 22 | 0000001 | 66 | 0011111 | 21 | 1000100 |
| 23 | 0000001 | 67 | 0011111 | 22 | 1000010 |
| 24 | 0000001 | 68 | 0011111 | 23 | 1000000 |
| 25 | 0000001 | 69 | 0011111 | 24 | 0111110 |
| 26 | 0000001 | 70 | 0011111 | 25 | 0111100 |
| 27 | 0000001 | 71 | 0011111 | 26 | 0111010 |
| 28 | 0000001 | 72 | 0011111 | 27 | 0111000 |
| 29 | 0000001 | 73 | 0011111 | 28 | 0110110 |
| 30 | 0000001 | 74 | 0011111 | 29 | 0110100 |
| 31 | 0000001 | 75 | 0011111 | 30 | 0110010 |
| 32 | 0000010 | 76 | 0011111 | 31 | 0110000 |
| 33 | 0000011 | 77 | 0011111 | 32 | 0101110 |
| 34 | 0000100 | 78 | 0011111 | 33 | 0101100 |
| 35 | 0000101 | 79 | 0011111 | 34 | 0101010 |
| 36 | 0000110 | 80 | 0011111 | 35 | 0101000 |
| 37 | 0000111 | 81 | 0011111 | 36 | 0100110 |
| 38 | 0001000 | 82 | 0011111 | 37 | 0100100 |
| 39 | 0001001 | 83 | 0011111 | 38 | 0100010 |
| 40 | 0001010 | 84 | 0011111 | 39 | 0100000 |
| 41 | 0001011 | 85 | 0011111 | 40 | 0011110 |
| 42 | 0001100 | 86 | 0011111 | 41 | 0011100 |
| 43 | 0001101 | 87 | 0011111 | 42 | 0011010 |
| 44 | 0001110 | 88 | 0011111 | 43 | 0011000 |
| 45 | 0001111 | 89 | 0011111 | 44 | 0010110 |
| 46 | 0010000 | 90 | 0011111 | 45 | 0010100 |

FIG. 12B

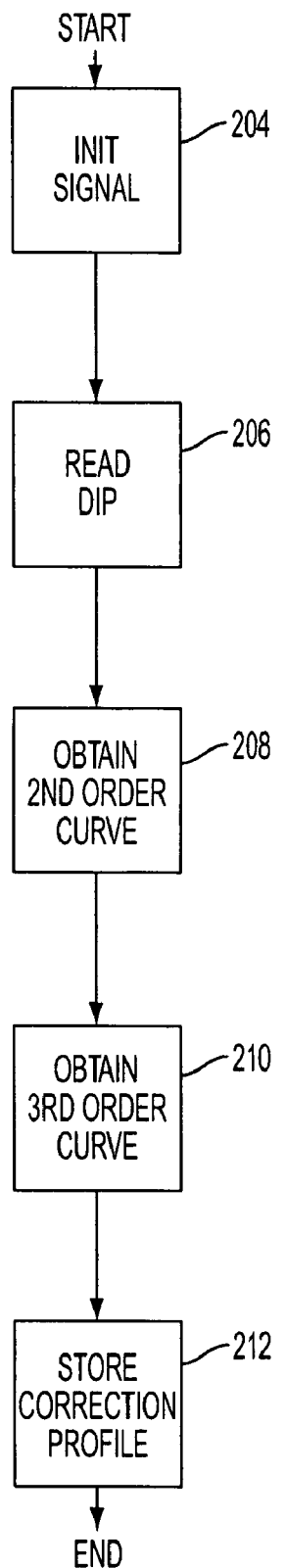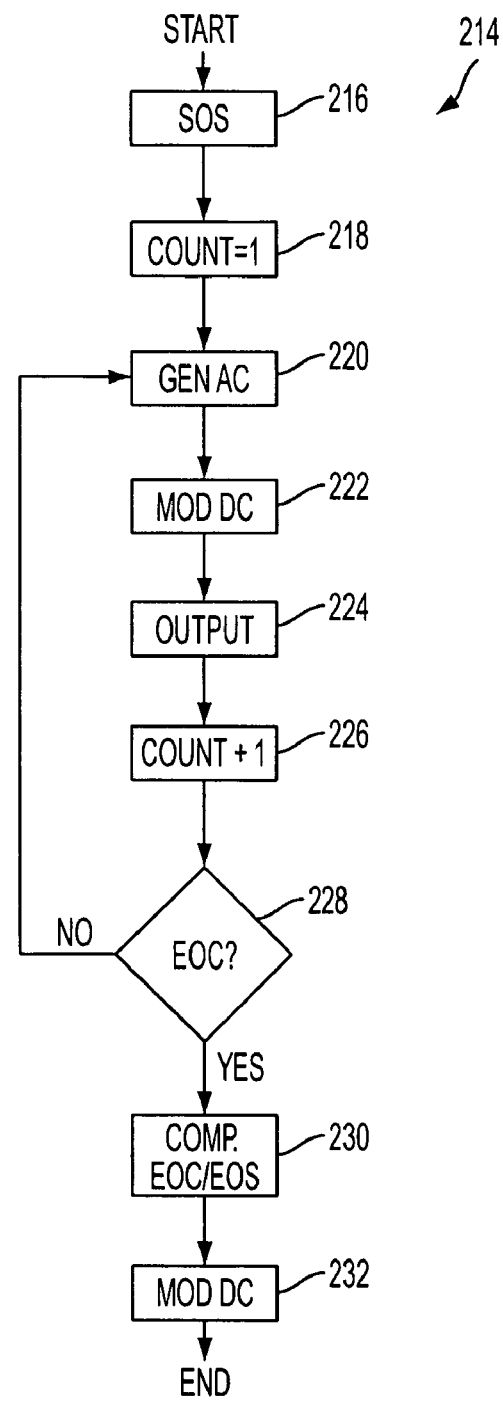
FIG. 13
FIG. 14

SYSTEM AND METHOD FOR REDUCING NON-LINEARITY ERRORS BETWEEN TWO IMAGING STATIONS

TECHNICAL FIELD

The technical field relates to printing systems and, more particularly, to printing systems having more than one imaging station.

BACKGROUND

A Raster Output Scanner (ROS) and a Light Emitting Diode (LED) print bar, also known as imagers and used in electro-photographic machines are well known in the art. The ROS or the LED print bar is positioned in an optical scan system to write an image on the surface of a moving photoreceptor belt. The photoreceptor belt is then used to transfer the image onto a piece of paper. In some systems, the output of an ROS imaging station is used to write a black image onto the photoreceptor belt and the output of an LED print bar imaging station is used to add a color component to the image. Obviously, alignment of the two imaging stations is important for the reduction of blurring of the colorized image. Several factors affect the ability to accurately align the two imaging stations.

One such factor is that certain errors that are not present in an LED print bar imaging system are inherent to the physical structure and operation of an ROS imaging system. A typical ROS imaging system 10 as shown in FIG. 1 includes a light source 12 for generating a light beam 14 and a mirror 16 for directing the light beam 14 to a spot 18 on a photosensitive medium 20. The mirror 16 also serves to move the spot 18 to generate a scan line 22 of specified width along the photosensitive medium 20. To that end, the mirror 16, which in this embodiment comprises a rotatable polygonal mirror with a plurality of light reflecting facets 24 (only four of eight facets are shown), is rotated about a rotational axis 26 in the direction of an arrow 28. Thus, light impinging on the mirror 16 is swept across the photosensitive medium 20 as the mirror 16 rotates as described below.

The light source 12, which in this embodiment is a laser diode, emits a modulated coherent light beam 14 of a single wavelength. The light beam 14 is modulated in conformance with an image information data stream contained in the video signal sent from the light source control circuit 30 to the light source 12. The modulated light beam 14 is collimated by a collimating lens 32 and then focused by a cross-scan cylindrical lens 34 to form a spot on a reflective facet 24 of the rotating polygonal mirror 16.

As the polygonal mirror 16 is rotated around its axis of rotation 26 by a conventional motor (not shown), the beam 14 is reflected from the facet 24 and passes through the f-theta scan lenses 36 and the anamorphic wobble correction lens 38. The f-theta scan lens 36 consists of a negative plano-spherical lens 40, a positive plano-spherical lens 42, and the cross-scan cylinder lens 44. This configuration of f-theta scan lenses has sufficient negative distortion to produce a linear scan beam. Thus the light beam that is deflected at a constant angular velocity from the rotating mirror is theoretically modified optically by the f-theta scan lens to scan the photosensitive material 20 at a constant linear velocity.

After passing through the f-theta scan lens 36, the light beam 14 passes through the wobble correction anamorphic lens element 38. The wobble correction element can be a lens or a mirror and is sometimes referred to as the "motion compensating optics." The purpose of the wobble correction element 38 is to correct wobble along the scan line 22 generated by inaccuracies in the polygonal mirror/motor assembly. The wobble correction element 38 then focuses the light beam in the cross-scan plane onto the scan line 22 on the photosensitive medium 20.

Accordingly, as the polygonal mirror 16 rotates, the light beam 14 is reflected by the facets 24 through the f-theta lens 36 and the wobble correction element 38 and scans across the surface of the photosensitive medium 20 along the scan line 22 from a first end 46 of the scan line 22 (referred to herein as the Start of Scan or "SOS") past a center position (the illustrated position of the spot 18) and on to a second end 48 of the scan line 22 (referred to herein as the End of Scan or "EOS"). The light beam 14 thus exposes an electrostatic latent image on the photosensitive medium 20. As the polygonal mirror 16 rotates, the exposing light beam 14 is modulated by a pixel clock (not shown) in the light source control circuit 30 to produce individual bursts of light that expose a line of individual pixels, or spots 18, on the photosensitive member 20.

It should be noted that the path followed by the light generated by the imaging station 10 does not change from one scan to the next. Thus, the latent image on the photosensitive medium 20 is generated by rotating the photosensitive medium 20 past the imaging station such that on a subsequent scan, a scan line is produced on the photosensitive medium that is adjacent to the previously produced scan line.

Ideally, the ROS imaging system exposes a line of evenly spaced pixels 18 on the photosensitive medium 20. For example, FIG. 2 shows a scan line 50 consisting of a series of pixels 52 uniformly spaced at a distance 54 based upon timing pulses from the pixel clock of the ROS imaging system for the designed resolution (e.g., the central portion of each pixel position is evenly spaced at $\frac{1}{300}$ inch intervals for 300 dpi resolution or is evenly spaced at $\frac{1}{600}$ inch intervals for 600 dpi resolution, etc.). Also shown in FIG. 2 are a plurality of desired pixel location lines 56. The desired pixel location lines 56 may be thought of as a series of parallel lines perpendicular to the scan line 50. The points at which the scan line 50 intersects the desired pixel location lines 56 indicate the desired locations for pixel placement. Thus, in the idealized schematic of FIG. 2, each pixel 52 is aligned with a desired pixel location line 56 and each desired pixel location line 56 is spaced apart at an even distance 54.

As a result of the inherent geometry of the optical system of the ROS, and because manufacturing errors can cause imperfections in the facets of a polygonal mirror, obtaining evenly spaced, identical pixels can be problematic. The uneven spacing is referred to as "scan non-linearity." FIG. 3 illustrates deviation from the uniform pixel placement of FIG. 2 due to scan non-linearity. The scan line 58 consists of a series of pixels 60 shown with the desired pixel location lines 62. The spacing of all of the pixels 60 does not coincide with the desired pixel location lines 62 as indicated by the scan line non-linearity error 64. The displacement of each of the pixels or pixel locations from the corresponding desired pixel location line may be shown by a curve referred to as a scan line non-linearity curve.

FIG. 4 shows a scan line non-linearity error curve 66 that reflects a zero position error at the SOS pixel 68 and the EOS pixel 70. The error curve 66 further includes both positive lobes 72 and negative lobes 74 between the SOS pixel 68 and the EOS pixel 70. Ideally, the error curve would be at zero across the entire scan line.

Scan line non-linearity is typically caused by system geometry or a velocity variation of the mirror 16. A scanner having a multifaceted rotating polygonal mirror, for example, directs the light beam toward the photosensitive material at a constant angular velocity; however, the photosensitive material 20 is farther from the polygonal facets 24 at the ends of the scan line 22 than it is at the center spot 18 as shown in FIG. 1. Accordingly, the speed at which the focused exposing light beam travels across the scan line 22 on the photosensitive medium 20, or spot velocity, is higher toward the ends of the scan line 22 and lower toward the center of the scan line 22. Without correcting for this inherent scan line non-linearity, the image being transferred to the photosensitive material will be distorted.

Distortion of the transferred image is small. Moreover, in an electro-photographic machine with only a single imaging station, such as a black and white imaging station, all of the images transferred to the photosensitive material include the identical distortion. Accordingly, the transferred image is generally not noticeably distorted even when no correction is made for the scan non-linearity. Such an imaging station in a machine that includes a second imaging station, so as to produce a colored image, however, results in noticeable distortion.

Noticeable distortion occurs as a result of the use of LED print bar imaging systems to provide the color image on the photosensitive material. LED print bar imaging stations generally consist of a linear array of light emitting diodes. As the photoreceptor material is advanced in the process direction, each LED in the LED print bar is individually controlled to produce a respective pixel. Therefore, because the pixels are not being created by a single centrally located source of light, the LED print bar imaging systems do not normally generate images with scan line non-linearity errors of the same magnitude as the scan line non-linearity errors generated by an ROS imaging system. Accordingly, overlaying the distorted image of an ROS imaging system with a less distorted image of an LED print bar imaging system results in a transferred image with noticeable distortion since corresponding black and color pixels are unevenly spatially separated along the scan line.

Known systems compensate for such scan line non-linearity differences electronically using a variable frequency pixel clock (sometimes called a scanning clock). The pixel clock produces a pulse train (i.e., a pixel clock signal) that is used to turn the light beam emitted by the light source of the ROS imaging system on and off at each pixel location along the aim line. Accordingly, varying the clock frequency and thereby the timing of individual pulses in the pulse train serves to control pixel placement along the scan line. The shape of the non-linearity signature varies, however, from one ROS imaging system to another ROS imaging system. Thus, each system is typically individually measured and programmed using complex measurements and computer programs.

As set forth in U.S. Pat. No. 6,178,031, known electro-photographic systems provide for such measurements and programming with various electro-photographic machines. Known methods used to generate the desired pixel clock modulation generally rely upon the electro-photographic machine to perform the computational functions to generate a correction. Such computations may be significant as the corrections may be in the form of a fifth order polynomial.

Some electro-photographic machines do not include the internal communication and processing capability to support such complicated corrections of scan line non-linearity. Nonetheless, the reduction of scan line non-linearity differences between imaging stations in such machines is still desired.

Accordingly, reduction of the distortion resulting from the overlay of the outputs from two imaging systems that do not have identical scan line non-linearity errors is needed. Furthermore, the reduction of such distortion in machines with two imaging systems and reduced communication and processing capability is needed. Additionally, the reduction of overlay distortions using simple programming and adjustments is needed.

SUMMARY

The present system and method relate to reducing scan line non-linearity errors between the output of two imaging stations in an electro-photographic device. In one embodiment, a multiple image station printer device includes a photosensitive material and a memory for storing a plurality of second order polynomial curve profiles and a plurality of third order polynomial curve profiles. The device further includes a non-linearity error identifier for identifying one of the plurality of second order polynomial curve profiles and one of the plurality of third order polynomial curve profiles and a pixel clock modifier for modifying the frequency of the pixel clock based upon the identified one of the plurality of second order polynomial curve profiles and one of the plurality of third order polynomial curve profiles so as to reduce scan line non-linearity errors between a first imaging station and a second imaging station.

A method of reducing scan line non-linearity errors in a device is performed by storing a plurality of second and third order polynomial curve profiles and identifying one each of the plurality of second and third order polynomial curve profiles. The frequency of a pixel clock is modified based upon the identified one of the plurality of second order polynomial curve profiles and the identified one of the plurality of third order polynomial curve profiles.

In an alternative method, scan line non-linearity errors in a multistage imaging device are reduced by generating a first, a second and a third visible scan line non-linearity identifier with the device. A second order polynomial curve profile is identified based upon the first visible scan line non-linearity identifier and a third order polynomial curve profile is identified based upon the second visible scan line non-linearity identifier and the third visible scan line non-linearity identifier. The frequency of a pixel clock in the device is modified using the second order polynomial curve profile and the third order polynomial curve profile.

The above-described features and advantages, as well as others, will become more readily apparent to those of ordinary skill in the art by reference to the following detailed description and accompanying drawings.

BRIEF DESCRIPTION OF THE DRAWINGS

FIGS. 12A and 12B show lookup tables that may be used in conjunction with the printout of FIG. 9 to obtain switch configurations for a dual in-line package (DIP) to identify a second order polynomial curve and a third order polynomial curve for reducing the scan line non-linearity errors identified using the printout of FIG. 9; and FIG. 13 shows a method for initializing a light source control circuit in order to reduce the scan line linearity errors between corresponding pixels of two imaging stations in accordance with one embodiment.

FIG. 14 shows a method for modulating the frequency of a pixel clock in order to reduce the scan line linearity errors between corresponding pixels of two imaging stations in accordance with one embodiment.

DETAILED DESCRIPTION

Figure 1:
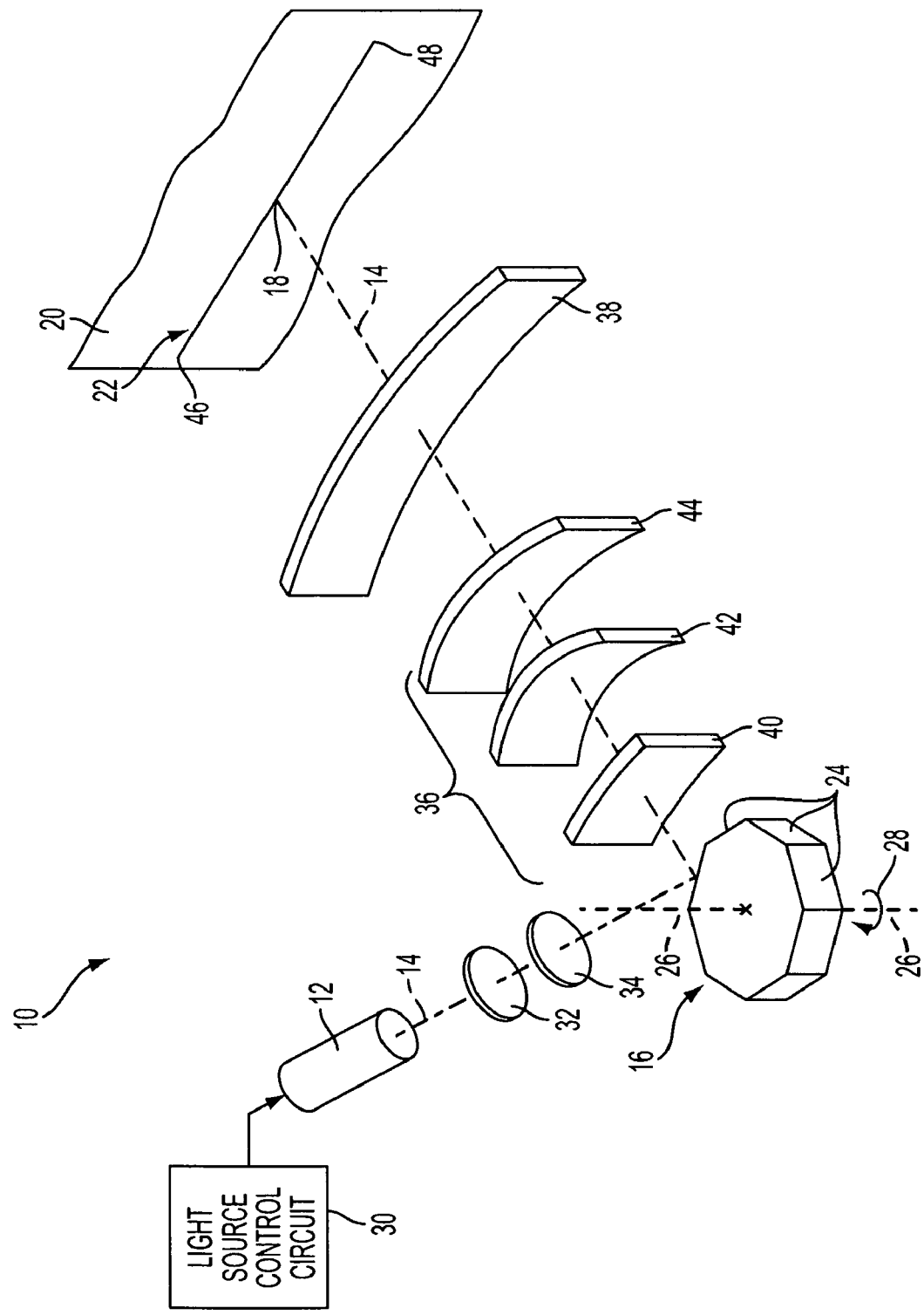
FIG. 1 shows a schematic perspective view of a prior art raster output scanning (ROS) imaging system.
Figure 2:
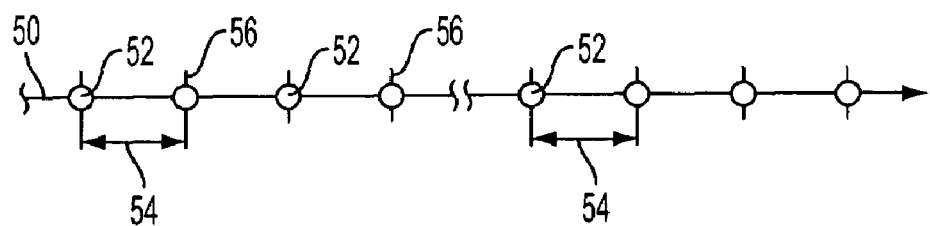
FIG. 2 shows a schematic top view of idealized pixel placement along a scan line.
Figure 3:
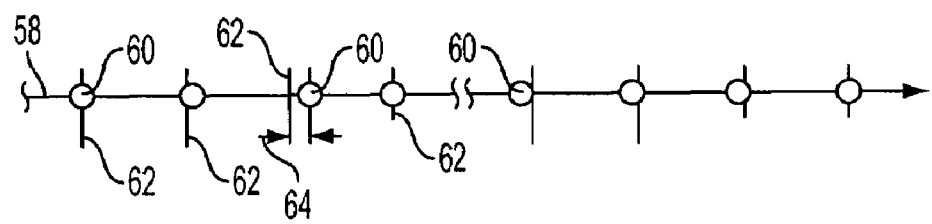
FIG. 3 shows a schematic top view of pixel placement along a scan line with scan line non-linearity.
Figure 4:
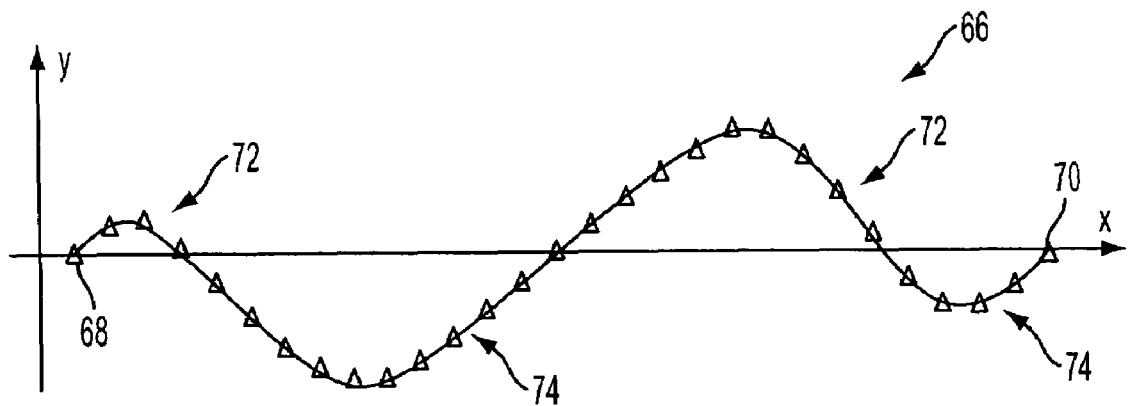
FIG. 4 shows an exemplary graph of the magnitude of scan line non-linearity errors across a scan line.
Figure 5:
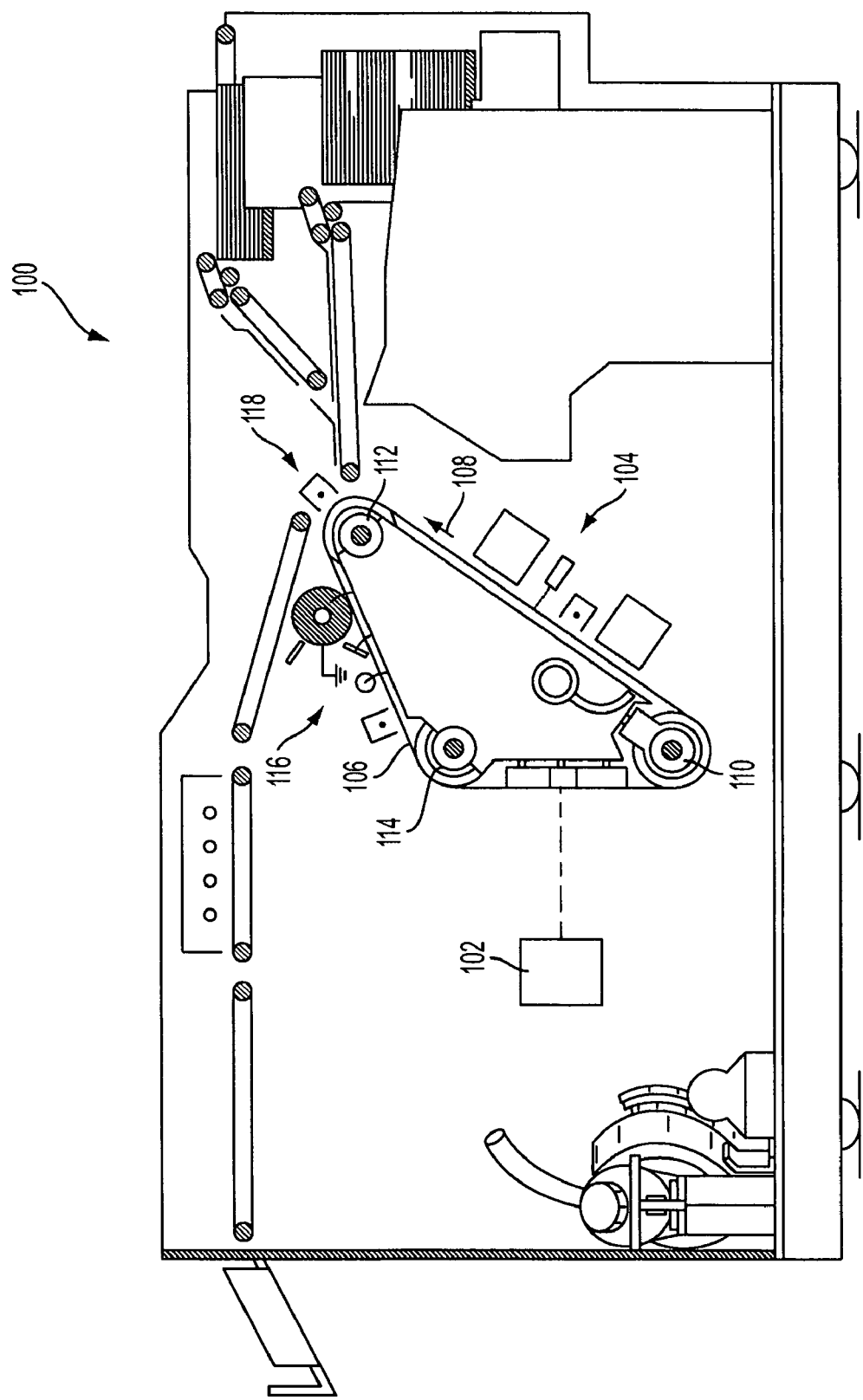
FIG. 5 shows an exemplary electro-photographic device with two imaging stations.

An electro-photographic imaging device 100 shown in FIG. 5 includes an ROS imaging system 102 and an LED print bar imaging system 104. The ROS imaging system 102 and the LED print bar imaging system 104 are configured to write images onto a photosensitive material on belt 106 using bursts of light to generate pixels on the belt 106. The belt 106 is driven by a motor (not shown) in the direction of the arrow 108 around three pulleys 110, 112 and 114.

The electro-photographic imaging device 100 further includes a charging station 116 and an exposure station 118. The charging station 116 may use a corona generating device to charge the photosensitive material on the belt 106 to a high, substantially uniform potential. The belt 106 is then rotated past the ROS imaging system 102 and the LED print bar imaging system 104 which write electrostatic latent images onto the photosensitive material. The exposure station 118 then develops the latent image which is subsequently transferred to a blank copy sheet.

Figure 6:
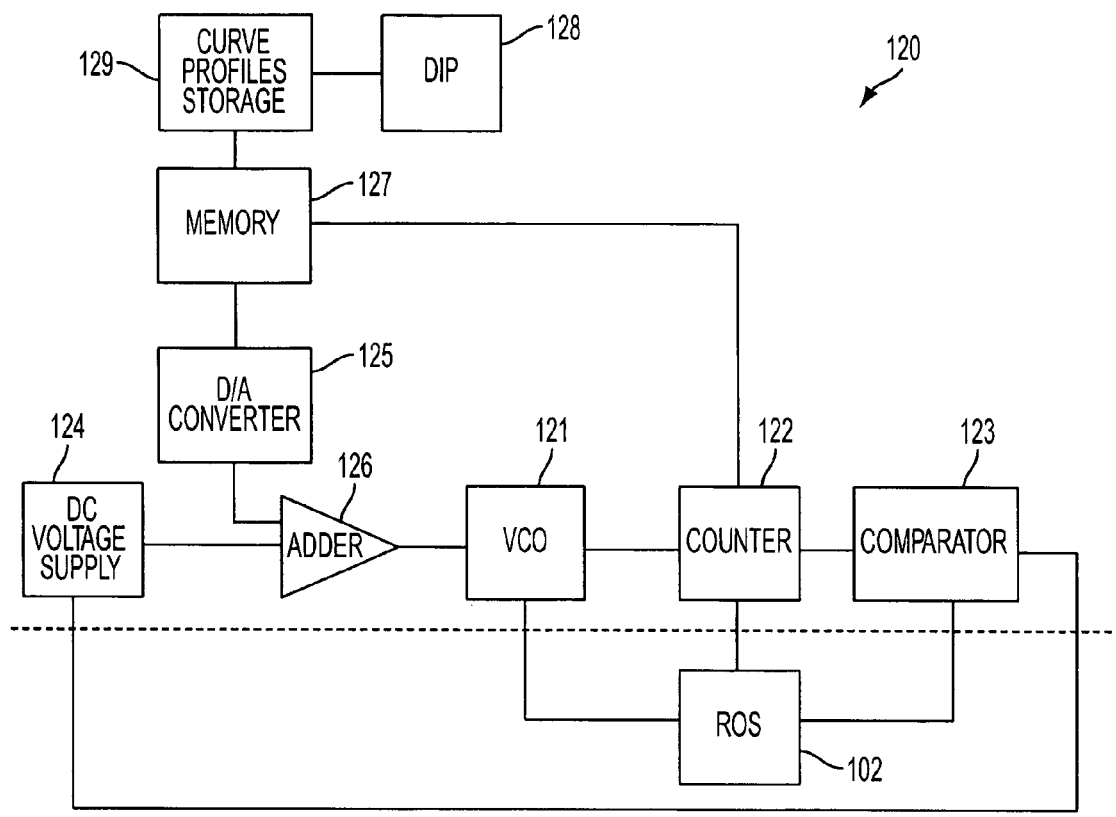
FIG. 6 shows a schematic diagram of the light control circuit of the electro-photographic device of FIG. 5.

The ROS imaging system 102 is modulated by a light source control circuit 120 shown in FIG. 6. The light source control circuit 120 includes a voltage controlled oscillator (VCO) 121 wherein the output frequency of the VCO 121 is determined by the input voltage. The output of the VCO 121 is provided to the ROS imaging system 102 to control a light source within the ROS imaging system 102 on and off based upon in order to selectively illuminate a facet on a rotating mirror. The output of the VCO 121 is further provided to a counter 122. The counter 122 counts the clock pixels from the VCO 121 starting when an SOS signal is received from the ROS imaging system 102 and generates an end of count (EOC) pulse at the pixel count that should coincide with the EOS of the ROS imaging system 102. The EOS and EOC signals are provided to a comparator 123 which adjusts the input voltage that is being supplied to the VCO 121 from a DC voltage supply 124. Specifically, the output of the DC voltage supply 124 is adjusted up or down depending on which of the EOS and EOC signals occurs first, thus adjusting the clock frequency generated by the VCO 121 such that the EOS and the EOC occur at the same time.

The voltage supplied to the VCO 121 is further modified based upon the output from a digital to analog converter 125 which is combined with the output of the DC voltage supply 124 by an adder 126. The output from the digital to analog converter 125 acts as an AC modification of the DC voltage supplied to the VCO 121 by the DC voltage supply 124. The AC component is based upon a table that is stored in the memory 127.

The table is stored in the memory 127 prior to scanning. Specifically, the light source control circuit 120 reads the switch configuration of a twelve switch dual in-line package (DIP) 128. The switch configuration identifies a correction profile using second and third order polynomial curves programmed into a curve profiles storage 129. The correction profile is loaded into the memory 127 as a table. This table is the digital representation of the AC component to be applied to the voltage from the DC voltage supply 124. The particular value from the table that is provided to the digital to analog converter 125 is based upon the pixel being generated by the ROS imaging system 102 as counted by the counter 122. In one embodiment, a single value is used for a group of consecutive pixels, for example, a group of 102 pixels. Thus, a single table entry is passed to the digital to analog converter 125 for a group of 102 pixels and a new value is used when the next group of pixels is to be generated.

The curve profiles storage 129 is programmed with a plurality of predetermined second and third order polynomial curves. Various combinations of the curves may be used by the light source control circuit 120 to modulate the output frequency of the VCO 121 to effect the desired on and off times for the ROS imaging system 102. In this embodiment, there are 1,395 correction profiles possible using the second and third order polynomial curves programmed into the curve profiles 129, although more or fewer may be used. Each of the correction profiles corresponds to one of the switch configurations which may be realized using the twelve switches of the DIP 128.

Figure 7:
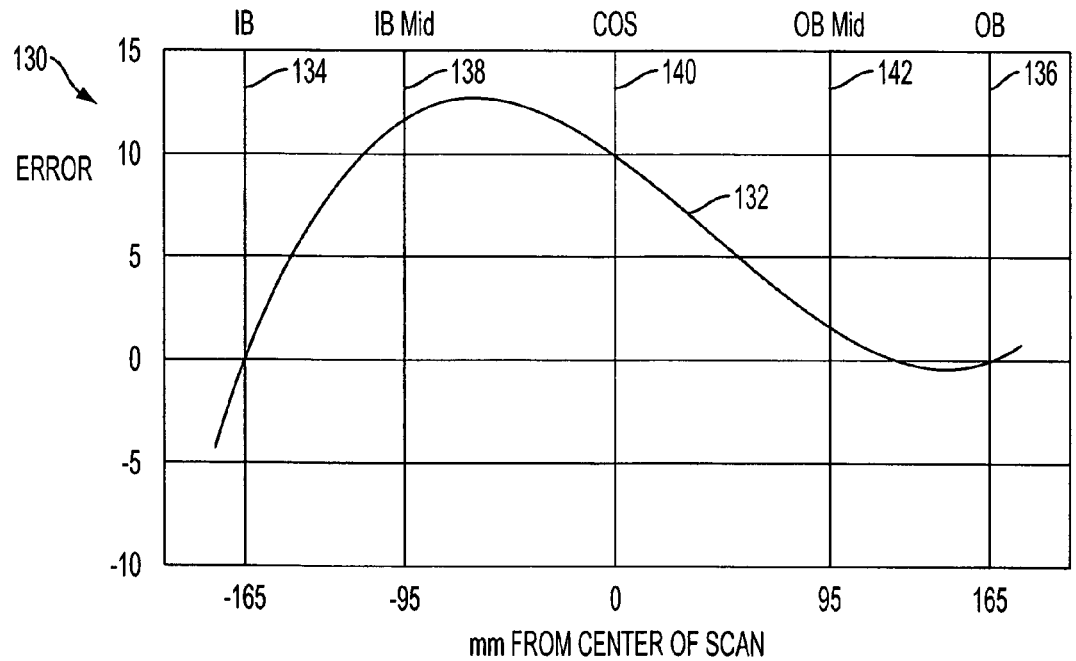
FIG. 7 shows an exemplary graph of an error curve depicting the magnitude of scan line non-linearity errors of pixels along a scan line of 330 millimeters.

By way of example, FIG. 7 depicts an exemplary graph of the magnitude of scan line non-linearity errors for each pixel location across a scan line prior to any correction. The graph 130 shows a scan line width of about 330 millimeters wherein the horizontal axis indicates the distance of the particular pixel away from the center of the scan line. The error curve 132 indicates the amount of the error in microns for each pixel across the scan line.

The graph 130 includes an inner boundary (IB) desired pixel location line 134 and an outer boundary (OB) desired pixel location line 136. The IB desired pixel location line 134 indicates the desired pixel location at the top of the sheet while the OB desired pixel location line 136 indicates the desired pixel location at the bottom of the sheet. The graph 130 further includes a center of scan (COS) desired pixel location line 140 corresponding to the center pixel of the scan line. The IB middle (IB Mid) desired pixel location line 138 and the OB middle (OB Mid) desired pixel location line 142 are located on either side of the COS desired pixel location line 140. As will be discussed more fully below, the IB Mid desired pixel location line 138 and the OB Mid desired pixel location line 142 are not located precisely in the middle of the COS desired pixel location line 140 and the IB desired pixel location line 134 or the OB desired pixel location line 136, respectively.

The graph 130 shows that at the IB desired pixel location line 134 and the OB desired pixel location line 136 the pixels generated by the ROS imaging system are at the desired location and hence, the value of the error curve 132 is "0." Just to the right of the IB Mid desired pixel location line 138, the error curve 132 reaches a peak value of about "13." The error curve 132 then decreases in value as the error curve 132 passes the COS desired pixel location line 140 down to a negative value slightly below "0" before increasing to "0" at the OB desired pixel location line 136.

Those of ordinary skill in the art will recognize that precise modeling of the curve 132 is possible using high order polynomials. Moreover, once such modeling is accomplished, a correction based upon the modeling may be readily applied to a pixel clock signal in order to significantly reduce scan line non-linearity errors. A sufficiently accurate correction, however, may also be applied based upon the summation of two relatively simple curves in conjunction with adjusting the linear displacement and magnification of the scan line.

Figure 8:
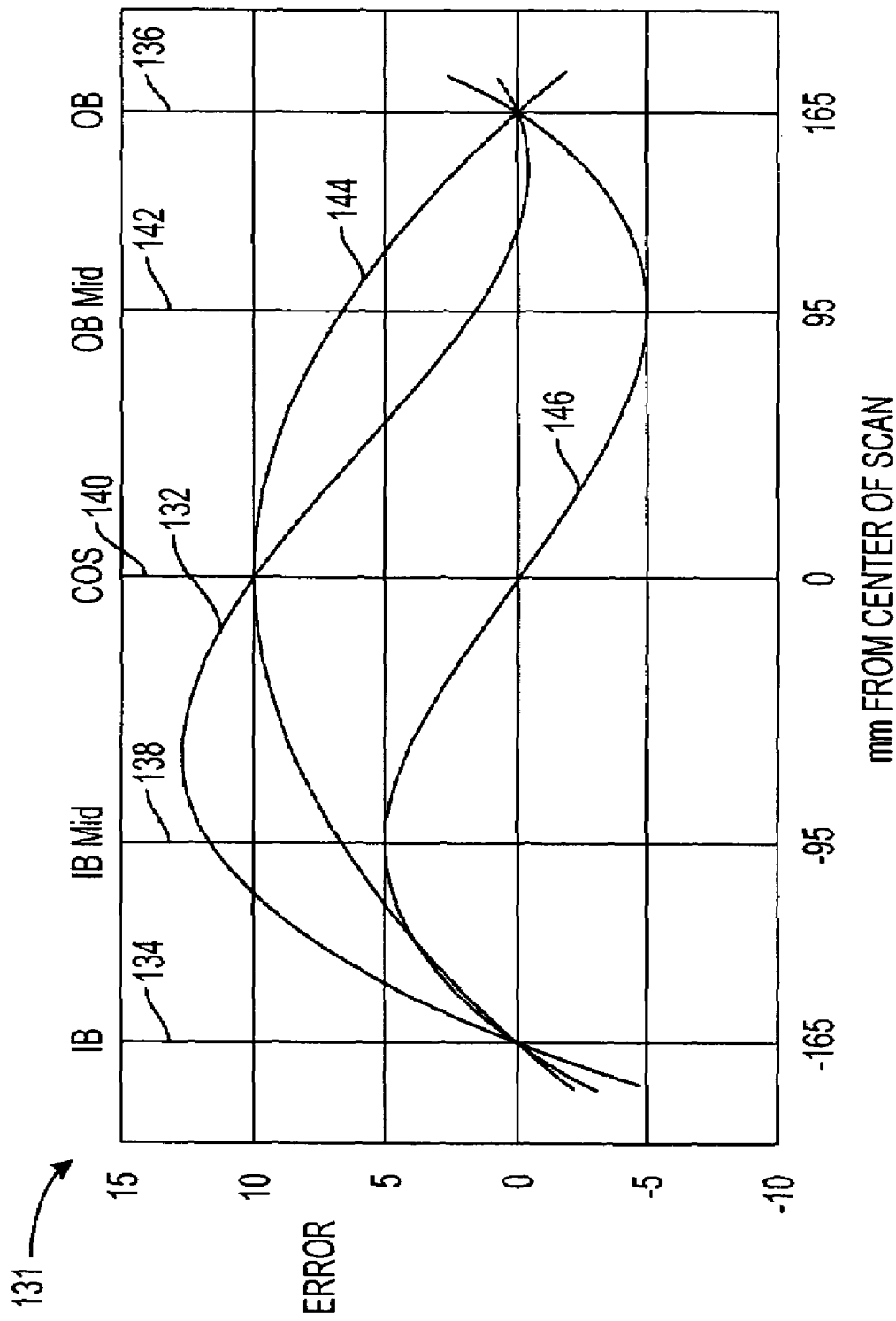
FIG. 8 shows a second order polynomial curve and a third order polynomial curve that when combined approximate the error curve of FIG. 7.

Specifically, FIG. 8 shows the graph 131 with the error curve 132 and two component curves that approximate the value of the error curve 132. A first component curve is a second order polynomial curve in the form of the curve 144. The second component curve is a third order polynomial curve in the form of the curve 146. The sum of the curves 144 and 146 closely approximate the value of the error curve 132. Thus, by using the summation of the curve 144 and the curve 146 as a non-linearity correction for the timing pulses of a pixel clock, significant reduction of scan line non-linearity is possible for an ROS imaging system without precise modeling of the error curve 132.

Moreover, the use of second and third order polynomial curves greatly simplifies the task of determining an effective pixel clock modulation for a given ROS imaging system since the scan line may be adjusted to realize specific relationships between the error curve and the various polynomial curves. By way of example, the IB desired pixel location error and OB desired pixel location error may be reduced by adjusting the linear displacement and magnification, respectively, of an ROS imaging system scan line. The scan line magnification is adjusted to match the width of the second imaging system which for this example is an LED print bar imaging system. Additionally, the IB pixel of the LED print bar imaging system and the IB pixel of the ROS imaging system are aligned on the same desired pixel location line. Thus, there is no significant scan line non-linearity error at the IB and OB pixel locations since both a generated color image and a generated black image would start and end at the same desired pixel location lines. This result is shown in FIG. 8 by the "0" value of the error curve 132 at both the IB desired pixel location line 134 and the OB desired pixel location line 136.

Since the error at the IB desired pixel location line 134 and the OB desired pixel location line 136 are "0," the second order polynomial curve and the third order polynomial curve may also be established as having values of "0" at the IB desired pixel location line 134 and the OB desired pixel location line 136. This necessarily establishes desired relationships between the error curve, the second order polynomial curve and the third order polynomial curve. These relationships are discussed herein with reference to the error curve 132, the second order polynomial curve 144 and the third order polynomial curve 146.

A first relationship is shown at the COS desired pixel location line 140. At the COS desired pixel location line 140, the third order polynomial curve 146 will have a value of "0." Thus, the value of the error curve 132 at the COS desired pixel location line 140 is solely the contribution of the second orderpolynomial curve 144. Additionally, at the COS desired pixel location line 140, the second order polynomial curve 144 will be at its maximum value. This is shown in FIG. 8 wherein both the error curve 132 and the second order polynomial curve 144 have a value of "10" at the COS desired pixel location line 140. Thus, definition of an algorithm that characterizes the second order polynomial curve is a simple matter since the second order polynomial curve has a maximum value of "10" at the COS desired pixel location line 140 and extends symmetrically to a value of "0" at the IB desired pixel location line 134 and the OB desired pixel location line 136 with a span of 330 millimeters.

Additional relationships are readily ascertainable by the advantageous selection of the location for the IB Mid desired pixel location line 138 and the OB Mid desired pixel location line 142. Specifically, the minimum and maximum values of a third order polynomial curve centered at the COS desired pixel location line 140 and having a value of "0" at the IB Mid desired pixel location line 138 and the OB Mid desired pixel location line 142, will occur at locations defined by the following formula:

$$x = \frac{\pm d}{\sqrt{3}}$$

wherein:

"x" is the distance away from the COS desired pixel location line 140; and

"d" is the distance between the COS desired pixel location line 140 and the IB desired pixel location line 134 or the OB desired pixel location line 136.

Thus, the IB Mid desired pixel location line 138 and the OB Mid desired pixel location line 142 may be approximated to be located at about 58 percent of the distance from the COS desired pixel location line 140 and the respective IB desired pixel location line 134 or the OB desired pixel location line 136.

Moreover, the minimum and maximum value of any third order polynomial curve with the above constraints will be equal but opposite in value. Thus, the IB Mid desired pixel location line 138 and the OB Mid desired pixel location line 142 are selected so as to coincide with the two maximum absolute value locations of third order polynomial curves between the IB desired pixel location line 134 or the OB desired pixel location line 136.

Given the scan line of 330 millimeters in graph 130, the maximum/minimum of third order polynomials will thus occur at about plus or minus 95 millimeters from the center of the scan line. Of course, since a second order curve is symmetrical about its center line, which is established in accordance with the present method to coincide with the COS desired pixel location line 140, the contribution to the error curve 132 of the second order polynomial curve 144 will be identical at 95 millimeters to the OB side of the COS desired pixel location line 140 and 95 millimeters to the IB side of the COS desired pixel location line 140.

Thus, the contribution to the value of the error curve 132 from the second order polynomial curve 144 at the IB Mid desired pixel location line 138 and the contribution to the value of the error curve 132 from the second order polynomial curve 144 at the OB Mid desired pixel location line 142 will be identical. Moreover, the contribution to the value of the error curve 132 from the third order polynomial curve 146 at the IB Mid desired pixel location line 138 and the contribution to the value of the error curve 132 from the third order polynomial curve 146 at the OB Mid desired pixel location line 142 will be the equal but opposite maximum/minimum values of the third order polynomial curve 146.

Accordingly, subtracting the value of the error curve 132 at either the IB Mid desired pixel location line 138 or the OB Mid desired pixel location line 142 from the other of the IB Mid desired pixel location line 138 or the OB Mid desired pixel location line 142, results in a number that is twice the absolute value of the maximum value of the third order polynomial curve 146. For example, the error curve 132 has a value of "11.6" at the IB Mid pixel and a value of "1.6" at the OB Mid pixel. Therefore, subtracting "1.6" from "11.6" results in a value of "10" which is twice the maximum absolute value of "5" (or "–5") for the third order polynomial curve 136 at the IB Mid desired pixel location line 138 (or the OB Mid desired pixel location line 142).

Thus, definition of an algorithm that characterizes the third order polynomial curve 146 is a simple matter since the third order polynomial curve 146 has a maximum value of "5" at the IB Mid desired pixel location line 138, a minimum value of "–5" at the OB Mid desired pixel location line 142 and a value of "0" at the IB desired pixel location line 134, the OB desired pixel location line 136 and the COS desired pixel location line 140.

Accordingly, by obtaining scan line non-linearity error measurements at three locations across a scan line generated by an ROS imaging system, identification is possible of a second order polynomial curve and a third order polynomial curve that, when combined, closely approximate the ROS imaging system scan line non-linearity errors. Advantageously, the desired scan line non-linearity error measurements are easily obtained from an electro-photographic device. This may be accomplished by controlling the electro-photographic machine to provide a printout 150 as shown in FIG. 9.

Figure 9:
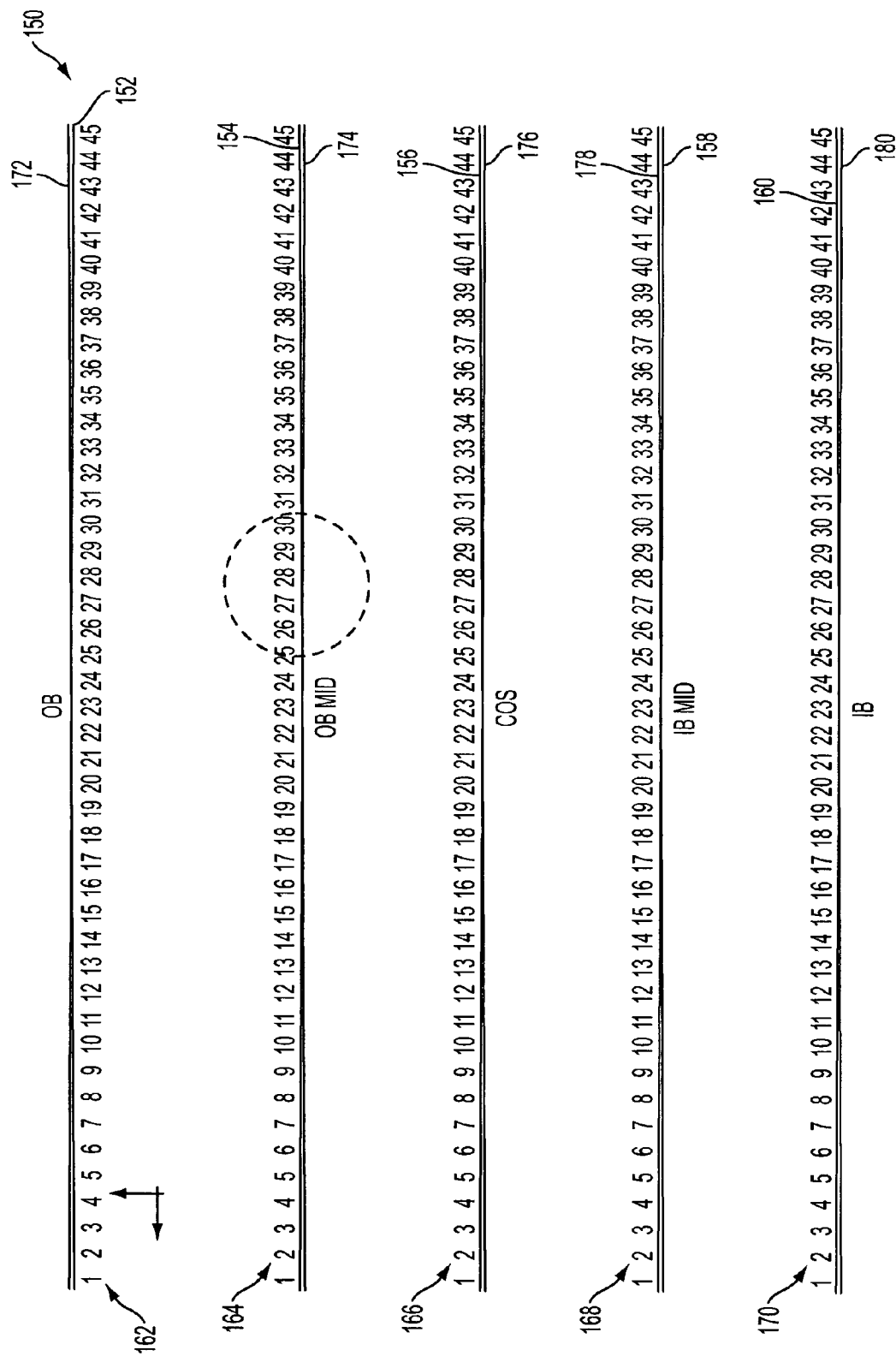
FIG. 9 shows a printout from an electro-photographic device that may be used to identify a second order polynomial curve and a third order polynomial curve that when combined approximate the error curve of an imaging station in an electro-photographic device.

FIG. 9 shows a scan line non-linearity correction determination printout 150. The scan lines used to generate the printout 150 in this embodiment scan from the bottom of the image on a printed page to the top of the image. Thus, the portion of the image generated by the IB pixel is located at the bottom of the printout 150 and the portion of the image generated by the OB pixel is located at the top of the printout 150 as shown in the FIG. 9. The first scan line is used to generate the portion of the image to the left side of the printout 150 and the last scan line is used to generate the portion of the image to the right side of the printout 150.

The printout 150 includes five horizontal lines 152, 154, 156, 158 and 160. The five horizontal lines 152, 154, 156, 158 and 160 are printed with the imaging system with which the ROS imaging system is to be aligned. In this example, the five horizontal lines 152, 154, 156, 158 and 160 are printed with the LED print bar imaging system. The locations of the lines are selected such that the horizontal line 152 corresponds with the pixel location of the LED print bar imaging system that is selected to be the OB pixel location. That is, the selected LED print bar imaging system OB pixel location is illuminated to generate the horizontal line 152. Similarly, the horizontal line 154 corresponds with the selected OB Mid pixel location, the horizontal line 156 corresponds to the selected COS pixel location, the horizontal line 158 corresponds to the selected IB Mid pixel location, and the horizontal line 160 corresponds to the selected IB pixel location.

The printout 150 further includes five series of reference numbers associated with each of the five horizontal lines 152, 154, 156, 158 and 160. Each of the five series 162, 164, 166, 168 and 170 includes the numbers 1-45. The centers of the numbers are evenly spaced across the entire width of the printout 150. Each of the numbers represents a one pixel (42.3 micron) shift in registration as is discussed below.

Finally, the printout 150 includes five lines 172, 174, 176, 178 and 180 that intersect the horizontal lines 152, 154, 156, 158 and 160, respectively. The generation of the five lines 172, 174, 176, 178 and 180 is explained with reference to line 174. First, the pixel location from the ROS imaging system that corresponds to the LED print bar pixel location used to generate the horizontal line 154 is selected. For this discussion, this pixel location will be referred to as the ROS OB Mid pixel location. Next, the ROS imaging system is controlled to generate a line beginning at the left side of the printout 150 at a pixel location that is located 22 pixel locations to the OB direction of the ROS OB Mid pixel location. The line is formed by sequentially illuminating a series of pixel locations over a sequence of scans until the line terminates at a pixel location that is located 22 pixel locations to the IB direction of the ROS OB Mid pixel location.

Accordingly, if there is no scan line non-linearity error between the ROS imaging system and the LED print bar imaging system, the line 174 would intersect the line 154 at the midpoint of the line 154, which is directly beneath the number 23 of the reference series 164. As shown more clearly in FIG. 10, the line 174 actually intersects the line 154 beneath the number 28 in the reference series 164. Thus there is some scan line non-linearity error between the ROS OB Mid pixel location and the LED print bar imaging system OB Mid pixel location.

Figure 10:
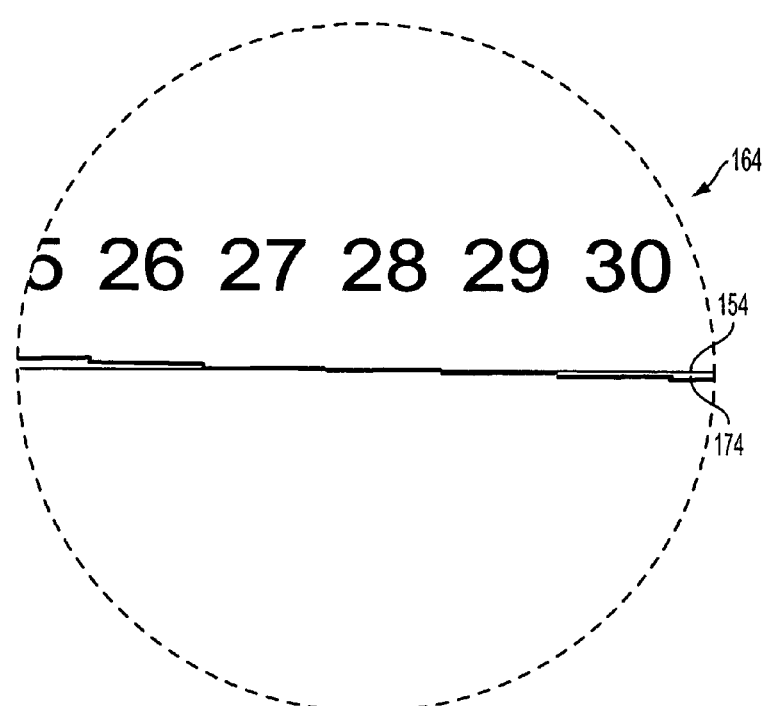
FIG. 10 shows a detail view of a portion of the printout of FIG. 9.

The amount of the error is easily determined in this embodiment. Specifically, since there are the same number of reference numbers as ROS imaging system pixel locations used to generate the line 174, each of the numbers in the reference series 164 corresponds to one of the ROS imaging system pixel locations. In other words, as shown in FIG. 10, a single ROS imaging system pixel location is used to generate the segment of the line 174 that is directly beneath a given reference number in the reference series 164. Therefore, each of the reference numbers 1-45 in the reference series 164 corresponds to one of the series of 45 pixel locations used to generate the line 174.

Thus, because the line 174 intersects the line 154 beneath the number 28 of the reference series 164, the scan line non-linearity error at this location is five pixels (28 minus 23) or 211.5 microns. Accordingly, by shifting the ROS OB Mid pixel location to the right by 211.5 microns, thus moving the line 174 toward the bottom of the printout 150, the ROS OB Mid pixel location will align with the LED print bar system pixel location used to generate the line 154. In this embodiment, the IB pixel is used to generate the lines at the bottom of the page. Thus, the pixel clock frequency must be modified to generate light at a faster rate to obtain the desired correction.

Obviously, when using this method, the pixel location that is selected as the OB pixel location and the pixel location that is selected as the IB pixel location on the LED print bar imaging system should be at least 22 pixel locations from the respective end of the LED bar. This offset from the actual end of the LED bar does not introduce an unacceptable amount of error into the correction determination.

Thus, the scan line non-linearity error between the ROS imaging system and the LED print bar imaging system may be easily determined using three intersections on the printout 150. The determined non-linearity errors may then be used to select a second order polynomial curve and a third order polynomial curve that when combined will closely approximate the scan line non-linearity error between the ROS imaging system and the LED print bar system. The light source control circuit 120 may then be used to modify the timing pulses from the VCO 121 so as to reduce the scan line non-linearity error between the ROS imaging system and the LED print bar system based upon the selected curves.

Of course, the second imaging station need not be controlled to generate a continuous line. For example, by simply generating two points along the desired line, a line is defined that may be used to identify the non-linearity error.

Figure 11:
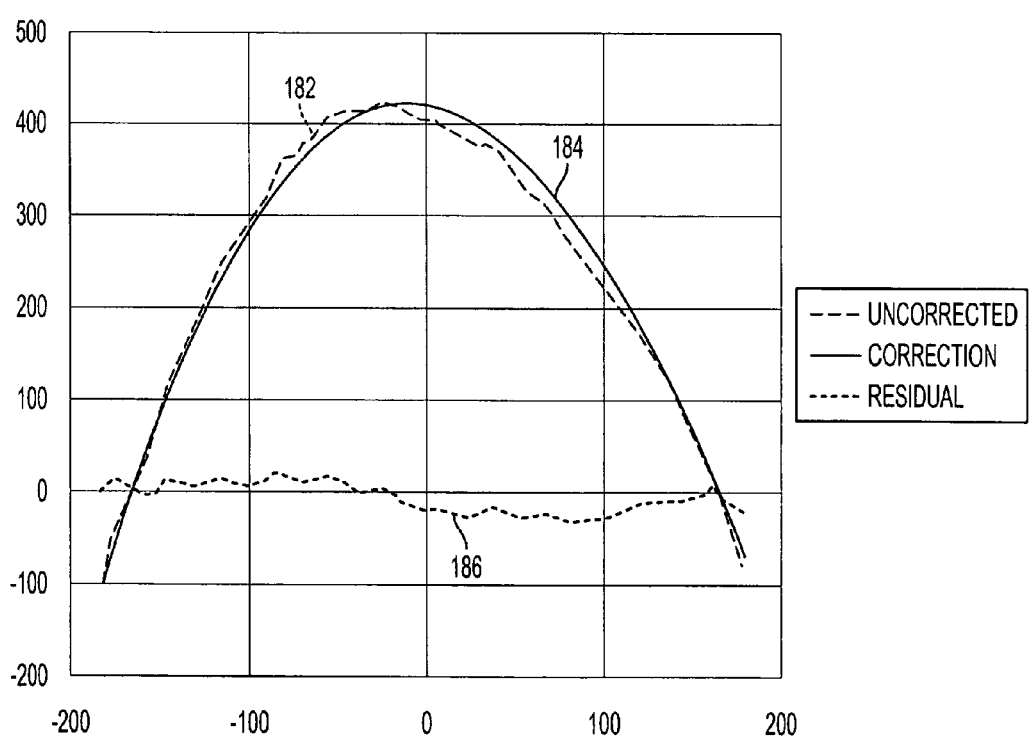
FIG. 11 shows a graph of an exemplary scan line non-linearity error curve, an approximated correction profile, and a residual scan line linearity error curve that results from the use of the approximated correction profile to modulate the frequency of a pixel clock used to generate a scan line.

One example of the correction of non-linearity errors is shown in FIG. 11. FIG. 11 depicts an uncorrected scan line non-linearity error curve 182, a correction curve 184 and a residual error curve 186. The correction curve 184 represents the combined second order polynomial curve and third order polynomial curve used to approximate the error curve 182. After using the correction curve 184 to modify the pixel clock of an ROS imaging system, the remaining scan line non-linearity error was significantly reduced as represented by the residual error curve 186.

Those of ordinary skill in the art will appreciate that a simple computer program may be devised to assess the errors at the five points discussed above with respect to FIG. 9 and to identify all of the needed corrections prior to correcting magnification or alignment errors. Specifically, the program would identify i) the needed magnification for the ROS imaging system to match the width of the LED print bar, ii) the location of the first pixel of the LED print bar so as to align the first pixel of the LED print bar imaging system with the first pixel of the ROS imaging system, iii) the best second order polynomial curve to reduce scan line non-linearity errors, and iv) the best third order polynomial curve to reduce scan line non-linearity errors.

In one embodiment, a computer program is used to identify the switch positions for the twelve switches of the DIP 128. The switch positions of the DIP 128 may be read by the light source control circuit 120 to identify the selected second and third order polynomial curves in the curve profiles storage 129 to be obtained to generate the correction profile.

The printout 150 may further be used to manually determine the needed corrections. In such an approach, the needed magnification for the ROS imaging system is established so as to match the width of the LED print bar and to match the location of the first pixel of the LED print bar with the first pixel of the ROS imaging system. Then, the operator identifies the number from the reference series 164, 166 or 168 underneath which the lines 174, 176 and 178 intersect the horizontal lines 154, 156 and 158, respectively. Using the identified reference numbers, the operator accesses lookup tables such as are shown in FIGS. 12A and 12B to determine the desired switch positions for the twelve switches (1-EN) of the DIP 128.

Figure 12A:
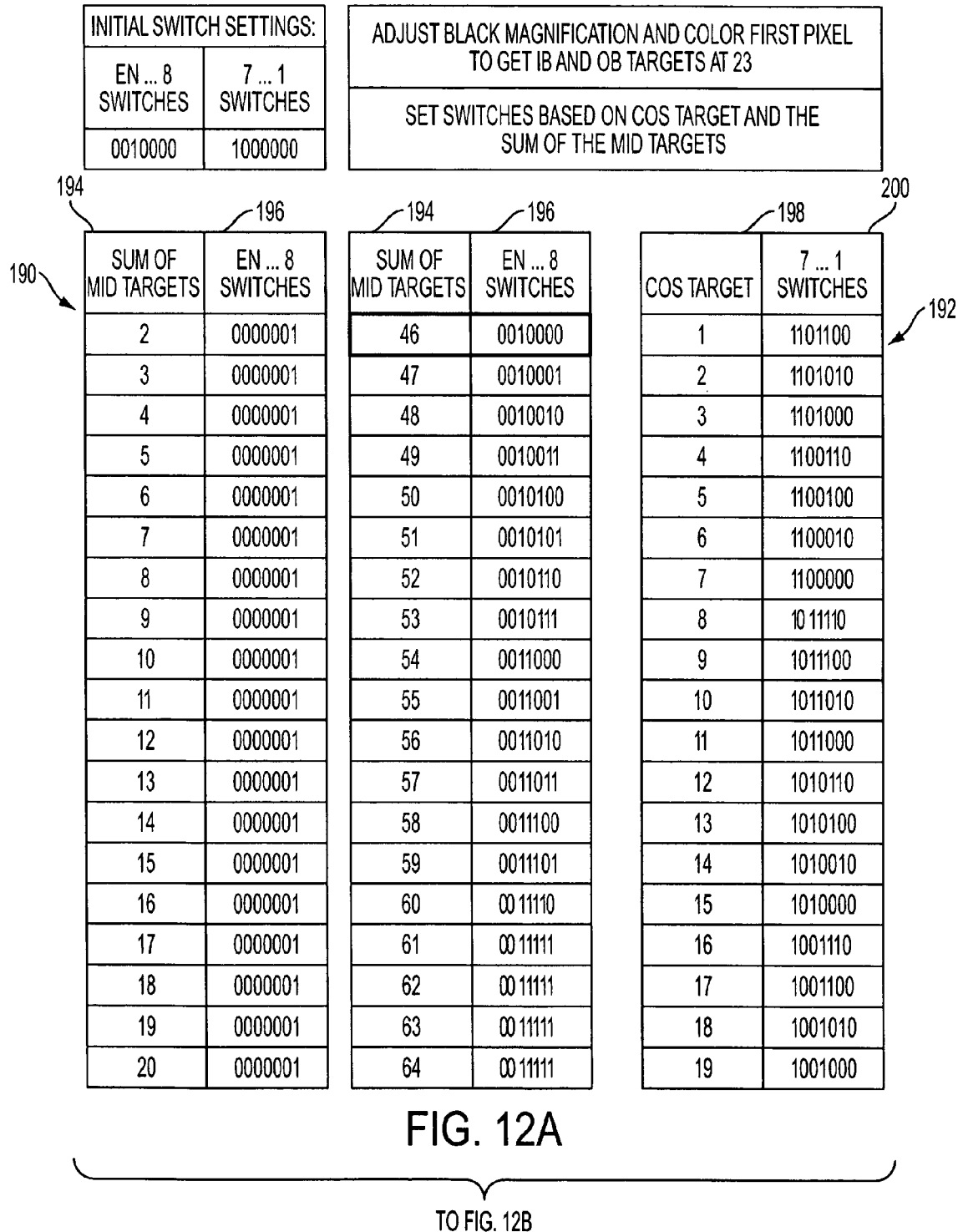

Specifically, FIGS. 12A and 12B show the lookup tables 190 and 192. The lookup table 190 includes two sum rows 194 and two switch selection rows 196. The lookup table 192 includes a COS target row 198 and a switch selection row 200. In this embodiment, five switches, switches 8-EN, of the DIP 128 are used to identify the selected third order polynomial curve. Accordingly, the two switch selection rows 196 identify thirty-one different switch configurations for the five switches. Seven switches, switches 1-7, of the DIP 128 are used to identify the selected second order polynomial curve and the switch selection row 200 identifies forty-five different switch configurations for the seven switches.

Accordingly, to identify the desired third order polynomial curve, the operator adds the identified reference numbers from the reference series 164 and 168. The operator then matches the sum of the identified reference numbers to one of the numbers listed in the two sum rows 194, and obtains the associated switch configuration from the associated switch selection row 196.

To identify the desired second order polynomial curve, the operator matches the reference number identified from the reference series 166 to one of the numbers listed in the COS target row 198, and obtains the associated switch configuration from the switch selection row 200. The twelve switches 1-EN of the DIP 128 are then configured in accordance with the obtained switch configurations.

Initialization of the light source control circuit 120 preparatory to performing a scan is explained with reference to the process 202 shown in FIG. 13. At the step 204, the light source control circuit 120 receives an initialization signal and at step 206 reads the switch positions set in the DIP 128. Then, based upon the switch positions 1-7 of the DIP 128, the light source control circuit 120 at the step 208 obtains from the curve profiles storage 129 a second order polynomial curve previously stored in the curve profiles storage 129 and associated with the particular switch configuration read by the light source control circuit 120.

At the step 210 the light source control circuit 120 obtains from the curve profiles storage 129 a third order polynomial curve previously stored in the curve profiles storage 129 and associated with the particular configuration of switches 8-EN of the DIP 128 read by the light source control circuit 120. Based upon the obtained second order polynomial curve and the obtained third order polynomial curve, at step 212 a correction profile is stored in the memory 127 in the form of a digital table and the initialization ends.

Operation of the light source control circuit 120 in performing a scan is explained with reference to the process 214 shown in FIG. 14. At the step 216, a start of scan signal is received by the light source control circuit 120. Accordingly, the counter 122 sets the counts to one at the step 218. The memory 127 then passes the value from the correction profile that is associated with the first pixel to the digital to analog converter 125 which converts the digital value to an analog value at step 220. At step 222, the analog value is added to the DC voltage from the DC voltage supply 124 and the modified DC voltage is provided to the VCO121. The DC voltage is converted to a clock pulse output by the VCO 121 at the step 224. The clock pulse is counted by the counter 122 at the step 226.

At the step 228, if the counter 122 has not incremented to the EOC, the process returns to step 220 for generation of another clock pulse. If the counter has incremented to the EOC, then an EOC pulse is generated and at step 230, the timing of the EOC pulse is compared to the timing of an EOS signal from the ROS imaging system 102. At step 232, the DC voltage supplied by the DC voltage supply 124 is modified based upon the comparison. Specifically, if the EOC pulse was received prior to the EOS signal, then the DC voltage is lowered so as to slow the rate of the generated clock pulse thereby delaying generation of subsequent EOC pulses. If the EOC pulse was received after the EOS signal, then the DC voltage is increased so as to increase the rate of the generated clock pulse thereby speeding up the generation of subsequent EOC pulses. The process then ends until the next SOS signal is received.

It will be appreciated that various of the above-disclosed and other features and functions, or alternatives thereof, may be desirably combined into many other different systems or applications. By way of example, but not of limitation, in accordance with one embodiment, all of the curve profiles are stored in a single programmable memory and the output from that device is determined based upon the output from a counter and the current scan position. Also that various presently unforeseen or unanticipated alternatives, modifications, variations or improvements therein may be subsequently made by those skilled in the art which are also intended to be encompassed by the following claims.

We claim:

1. A method of reducing scan line non-linearity errors in a device comprising:
   reading a first plurality of switches on a dual in-line package (DIP) to identify one second order polynomial curve profile in a plurality of stored second order polynomial curve profiles;
   reading a second plurality of switches on the DIP to identify one third order polynomial curve profile in a plurality of stored third order polynomial curve profiles;
   generating a scan line non-linearity correction profile with the identified second order polynomial curve profile and the identified third order polynomial curve profile; and
   modifying the frequency of a pixel clock in accordance with the generated non-linearity correction profile to reduce scan line non-linearity errors.

2. A method of reducing scan line non-linearity errors in a device comprising:
   generating a first visible non-linearity identifier;
   generating a second visible non-linearity identifier;
   generating a third visible non-linearity identifier;
   identifying one second order polynomial curve profile in a stored plurality of second order polynomial curve profiles based upon the first visible non-linearity identifier;
   identifying one third order polynomial curve profile in a plurality of third order polynomial curve profiles based upon the second visible non-linearity identifier and the third visible non-linearity identifier; and
   modifying the frequency of a pixel clock based upon the identified second order polynomial curve profile and the identified third order polynomial curve profile.

3. A method of reducing scan line non-linearity errors in a device comprising:
   generating a first visible non-linearity identifier with a first plurality of pixels on a photo sensitive medium generated with a first imaging station to form a reference line, and a second plurality of pixels on the photosensitive medium generated with a second imaging station to form an indicator line;
   generating a second visible non-linearity identifier;
   generating a third visible non-linearity identifier;
   identifying one second order polynomial curve profile in a stored plurality of second order polynomial curve profiles based upon the first visible non-linearity identifier;
   identifying one third order polynomial curve profile in a plurality of third order polynomial curve profiles based upon the second visible non-linearity identifier and the third visible non-linearity identifier; and
   modifying the frequency of a pixel clock based upon the identified second order polynomial curve profile and the identified third order polynomial curve profile.

4. The method of claim 3, the generation of the second visible non-linearity identifier comprises:
   generating a third plurality of pixels on the photo sensitive medium with the first imaging station; and
   generating a fourth plurality of pixels on the photosensitive medium using the second imaging station, and the generation of the third visible non-linearity identifier comprises:
   generating a fifth plurality of pixels on the photo sensitive medium with the first imaging station; and
   generating a sixth plurality of pixels on the photosensitive medium with the second imaging station.

5. The method of claim 4, the generation of the second visible non-linearity identifier further comprises:
   generating the third plurality of pixels to form a line on the photo sensitive medium located at about a first distance (x) to a first side of a middle point of a scan line of the first imaging station, and the generation of the third visible non-linearity identifier further comprises:
   generating the third plurality of pixels to form a line on the photo sensitive medium located at about a second distance (x) to a second side of the middle point of the scan line of the first imaging station, the magnitudes of both the first distance and the second distance being defined by the formula $$x = \frac{d}{\sqrt{3}}$$

wherein d=one half of a width of the scan line, and the first side is on a side of the middle point of the scan line opposite to the second side.

6. The method of claim 5, further comprising:
   setting a magnification of the first imaging device such that a width of the scan line of the first imaging device is equal to a width of a scan line of the second imaging device; and
   aligning a pixel location at an end portion of the scan line of the second imaging device with a pixel location at an end portion of the scan line of the first imaging device.

7. A method of reducing scan line non-linearity errors in a multistage imaging device comprising:
   generating a first visible scan line non-linearity identifier with the device;
   generating a second visible scan line non-linearity identifier with the device;
   generating a third visible scan line non-linearity identifier with the device;
   identifying a second order polynomial curve profile based upon the first visible scan line non-linearity identifier;
   identifying a third order polynomial curve profile based upon the second visible scan line non-linearity identifier and the third visible scan line non-linearity identifier; and
   modifying the frequency of a pixel clock in the device using the second order polynomial curve profile and the third order polynomial curve profile.

8. The method of claim 7 further comprising:
generating a first series of reference numbers with the device;
generating a second series of reference numbers with the device;
generating a third series of reference numbers with the device; and
the identification of a second order polynomial curve profile comprises:
correlating one of the reference numbers in the first series of reference numbers generated with the device to the first visible scan line non-linearity identifier; and
identifying the second order polynomial curve profile from a plurality of stored second order polynomial curve profiles based upon the first number correlated to the first visible scan line non-linearity identifier, and the identification of a third order polynomial curve profile comprises:
correlating one of the reference numbers in the second series of reference numbers generated with the device to the second visible scan line non-linearity identifier;
correlating one of the reference numbers in the third series of reference numbers generated with the device to the third visible scan line non-linearity identifier; and
identifying the third order polynomial curve profile from a plurality of stored third order polynomial curve profiles based upon the reference number correlated to the second visible scan line non-linearity identifier and the reference number correlated to the third visible scan line non-linearity identifier.

9. The method of claim 7, the generation of the first visible scan line non-linearity identifier comprises:
generating a first plurality of pixels on a photo sensitive medium with a first imaging station; and
generating a second plurality of pixels on a photosensitive medium with a second imaging station.

10. The method of claim 9, wherein generating the first visible scan line non-linearity identifier further comprises:
generating the first plurality of pixels so as to form a reference line on the photo sensitive medium with the first imaging station; and
generating the second plurality of pixels so as to form a line on the photosensitive medium that intersects the reference line with the second imaging station.

11. The method of claim 10, the identification of the second order polynomial curve profile further comprises:
correlating a reference number in the first series of reference numbers to the intersection.

12. The method of claim 9, the identification of the second order polynomial curve profile further comprises:
providing a table correlating a plurality of scan line non-linearity identifiers with a plurality of second order polynomial curve profiles; and
correlating the generated first visible scan line non-linearity identifier with one of the plurality of second order polynomial curves.

* * * * *